(12) United States Patent
Brück et al.

(10) Patent No.: US 6,854,263 B1
(45) Date of Patent: Feb. 15, 2005

(54) METHOD AND DEVICE FOR REGULATING THE TEMPERATURE RANGE OF AN $NO_x$ ACCUMULATOR IN AN EXHAUST SYSTEM OF AN INTERNAL COMBUSTION ENGINE

(75) Inventors: Rolf Brück, Bergisch-Gladbach (DE); Bernhard Pfalzgraf, Ingolstadt (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/556,662

(22) Filed: Apr. 24, 2000

Related U.S. Application Data

(63) Continuation of application No. PCT/EP98/06584, filed on Oct. 16, 1998.

(30) Foreign Application Priority Data

Oct. 22, 1997 (DE) .......................................... 197 46 658

(51) Int. Cl.[7] ................................................ F01N 3/00
(52) U.S. Cl. .............................. 60/285; 60/274; 60/297; 60/298; 60/320
(58) Field of Search ........................ 60/274, 284, 285, 60/298, 286, 280, 320, 297

(56) References Cited

U.S. PATENT DOCUMENTS

| | | | |
|---|---|---|---|
| 5,155,994 A | | 10/1992 | Muraki et al. |
| 5,474,745 A | | 12/1995 | Fukui et al. |
| 5,524,432 A | * | 6/1996 | Hansen .......................... 60/274 |
| 5,613,359 A | * | 3/1997 | Zahn et al. .................... 60/274 |
| 5,656,244 A | * | 8/1997 | Cole .............................. 422/171 |
| 5,685,145 A | * | 11/1997 | Sung et al. .................... 60/284 |
| 5,687,565 A | * | 11/1997 | Modica et al. ................. 60/274 |
| 5,722,236 A | * | 3/1998 | Cullen et al. .................. 60/274 |
| 5,743,084 A | * | 4/1998 | Hepburn ........................ 60/274 |
| 5,771,685 A | * | 6/1998 | Hepburn ........................ 60/274 |
| 5,983,628 A | * | 11/1999 | Borroni-Bird et al. ........ 60/274 |
| 6,347,511 B1 | * | 2/2002 | Haines .......................... 60/274 |

FOREIGN PATENT DOCUMENTS

| | | |
|---|---|---|
| DE | 2 046 180 | 6/1971 |
| EP | 0 415 128 A1 | 3/1991 |
| EP | 0 298 240 B1 | 10/1992 |
| EP | 0 485 179 B1 | 5/1995 |
| EP | 0 628 134 B1 | 10/1995 |

OTHER PUBLICATIONS

Published International Application No. WO 96/29141 (Sung et al.), dated Sep. 26, 1996.
Japanese Patent Abstract No. 06264822 (Kiyokazu), dated Sep. 20, 1994.
Heinz J. Robota: "Strategies for Lean $NO_x$ Control in Gasoline Lean Burn Engines", *SAE Advancements in Automotive Catalyst Technology TOPTEC*, Sep. 17–18, 1997.

\* cited by examiner

*Primary Examiner*—Binh Q. Tran
(74) *Attorney, Agent, or Firm*—Laurence A. Greenberg; Werner H. Stemer; Gregory L. Mayback

(57) ABSTRACT

A method and a device for controlling the temperature of an $NO_x$ accumulator to purify the exhaust gas stream of an internal combustion engine, can be used especially for diesel or lean-burn engines. A heat flow is carried off from the exhaust gas stream upstream of the $NO_x$ accumulator in the exhaust gas line depending on the operating state of the internal combustion engine, so that a maximum temperature of the $NO_x$ accumulator is not exceeded and more particularly so that a specified temperature range is maintained. In order to obtain a minimum operating temperature of the $NO_x$ accumulator, the internal combustion engine is operated at least at an air-fuel ratio of $\lambda \leq 1$ until the minimum operating temperature is reached.

27 Claims, 2 Drawing Sheets

METHOD AND DEVICE FOR REGULATING THE TEMPERATURE RANGE OF AN NO$_x$ ACCUMULATOR IN AN EXHAUST SYSTEM OF AN INTERNAL COMBUSTION ENGINE

CROSS-REFERENCE TO RELATED APPLICATION

This application is a continuation of copending International Application No. PCT/EP98/06584, filed Oct. 16, 1998, which designated the United States.

BACKGROUND OF THE INVENTION

Field of the Invention

The present invention relates to a method and a device for regulating the temperature range of an NOx accumulator in an exhaust system for purifying an exhaust gas stream of an internal combustion engine. The invention can be used, in particular, for purifying an exhaust gas stream in a diesel or lean-burn engine for clearing away substances present in the exhaust gas, such as unburned hydrocarbons, carbon monoxide and nitric oxides.

Increasing environmental awareness and more stringent exhaust gas legislation reflecting that environmental awareness make it necessary to even further reduce exhaust gas components which are contained in the exhaust gas of an internal combustion engine and are classified as harmful. Normally, in present-day motor vehicles, a three-way catalytic converter is used, through the use of which carbon monoxide (CO), unburned hydrocarbons (HC) and nitrogen oxides (NOx) are converted into harmless constituents.

European Patent 0 298 240 B1 states that, in the known exhaust gas catalytic converter systems, the exhaust gas behavior of the internal combustion engine can be deduced by determining the residual oxygen content in the exhaust gas through the use of an oxygen probe. That is done by determining the temperature profile at the catalytic converter and by determining the heat quantity released during the catalytic reaction.

Pollutants occur in an internal combustion engine during operation and, above all, during the cold-starting phase. It is therefore necessary to provide catalytic converters in the exhaust tract of an internal combustion engine. That is known, for example, from European Patent 0 628 134 B1. It is known, furthermore, from European Patent 0 485 179 B1 to use absorbers for the storage of unburned hydrocarbons which occur during the cold-starting phase and are discharged again when the downstream catalytic converter is ready for operation.

Where stationary internal combustion engines are concerned, the Air Pollution Regulations apply in Germany. The reduction in nitric oxide emissions from the exhaust gas of internal combustion engines is often carried out through the use of urea in the case of stationary systems.

That is not possible in internal combustion engines for motor vehicles, specifically inter alia, because of the tank to be carried along for that purpose and because of its weight. Particularly where commercial vehicles are concerned, it is known to carry out exhaust gas recirculation through the use of recooled exhaust gases. It is also known to reduce NOx emissions by water injection. It is known, furthermore, to reduce NOx emissions by first storing them intermediately in an NOx accumulator or storage device, from which they are then reduced to nitrogen through the use of controlled reactions with unburned hydrocarbons. In other words, the oxygen is thereby extracted from the NOx constituents.

The normal operating temperature range, within which NOx accumulators of that type operate reliably, is approximately 150° C. to 500° C. at the present time. The aim is to achieve an increase in the upper temperature to, for example, 700° C. through the use of new coatings. Above a maximum temperature of 800° C. at the present time, NOx accumulators are damaged, and therefore such temperatures must be avoided under all circumstances. NOx accumulators of that type are disposed in the exhaust system, as a rule downstream of a first catalytic converter. The reaction taking place in the first catalytic converter, in particular that of hydrocarbons with oxygen, is exothermal, so that a heat flow is supplied to the exhaust gas while the latter is being purified in the catalytic converter. Since the NOx accumulator only reaches its minimum operating temperature at a temperature of approximately 150° C., it is desirable, above all with a view to the cold-starting behavior of an exhaust gas purification system of that type, to place the NOx accumulator as closely as possible downstream of the first catalytic converter. When the internal combustion engine is in the full-load mode, during the exothermal reaction taking place in the first catalytic converter, exhaust gas temperatures downstream of the catalytic converter are reached which may be in the region of or above 100° C. Under those full-load conditions, it is therefore desirable to place the NOx accumulator as far as possible downstream of the first catalytic converter, in order to ensure that, even under those full-load conditions, the temperature of the NOx accumulator does not rise above approximately 800° C. The two conditions conflict with one another.

SUMMARY OF THE INVENTION

It is accordingly an object of the invention to provide a method and a device for regulating the temperature range of an NOx accumulator in an exhaust system of an internal combustion engine, which overcome the hereinafore-mentioned disadvantages of the heretofore-known methods and devices of this general type and which remove substances present in the exhaust gas, particularly in diesel and lean-burn engines, as far as possible, such as unburned hydrocarbons, carbon monoxide and nitric oxides, during all load conditions of the internal combustion engine, to avoid thermally induced damage to an NOx accumulator disposed in the exhaust system and to ensure rapid readiness for operation after cold starting.

With the foregoing and other objects in view there is a provided, in accordance with the invention, a method for regulating the temperature range of an NOx accumulator for purifying an internal combustion engine exhaust gas stream guided in an exhaust tract, which comprises discharging a heat flow from the exhaust gas stream upstream of the NOx accumulator as a function of an operating state of the internal combustion engine, for reliably preventing a maximum load temperature of the NOx accumulator from being exceeded and/or essentially maintaining a predeterminable temperature range.

The method according to the invention serves for purifying an exhaust gas stream in an internal combustion engine. According to the invention, in the method, a heat flow is discharged from the exhaust gas stream upstream of an NOx accumulator, which is also designated as an NOx adsorber, through the use of a heat exchanger, as a function of the operating state of the internal combustion engine. The heat exchanger is, above all, not in operation during the cold-starting phase, in order to assist in quickly reaching the operating temperature of the NOx accumulator, amounting to at least approximately 150° C. The greater the effect of the exothermal reaction of the first catalytic converter disposed in the exhaust tract becomes with an increasing load of the internal combustion engine, the greater becomes the cooling capacity of the heat exchanger necessary for discharging the heat flow and located upstream of the NOx accumulator. That reliably ensures that, during the entire operation of the internal combustion engine, the temperature of the NOx accumulator does not exceed 800° C. and/or is in a predeterminable temperature range. The method according to the invention for purifying an exhaust gas stream in an internal combustion engine thus serves for the operating reliability or for increasing the service life of the NOx accumulator. Consequently, reliable purification of the exhaust gas stream is achieved over the entire load range of the internal combustion engine. In general, the heat exchanger may be constructed in such a way that, purely by virtue of its structure, it discharges a small amount of heat at low temperatures and a large amount of heat at high temperatures (for example, a heat discharge based essentially on heat radiation). However, it is also possible, alternatively or additionally, to control or regulate the heat discharge through the use of additional measures.

In accordance with another mode of the invention, at least part of the heat energy contained in the exhaust gas stream is discharged as a heat flow from the exhaust gas stream upstream or downstream of a first catalytic converter. The energy fraction which is discharged as a heat flow upstream of the NOx accumulator depends, in this case, on the temperature limits of approximately 150° C. to 500° C. of conventional functioning or on the maximum temperature of 800° C. of the NOx accumulator.

In accordance with a further mode of the invention, the exhaust gas stream is discharged in two stages. In this case, the two-stage discharge of the heat flow may be carried out through the use of two heat exchangers disposed one behind the other upstream of the NOx accumulator or through the use of a heat exchanger in each case upstream of the first catalytic converter and between the first catalytic converter and the NOx accumulator. Particularly when a flow is discharged directly downstream of the internal combustion engine, the outlet temperature of the exhaust gas can also be lowered in a controlled manner downstream of the first catalytic converter, which is disposed upstream of the NOx accumulator, particularly when the internal combustion engine is under high load.

In accordance with an added mode of the invention, NOx are adsorbed and catalytic oxidation is carried out, both in the NOx accumulator. It is also possible, however, that initially, only NOx is adsorbed in the NOx accumulator and the unburned hydrocarbons that are necessary, for example, for regenerating the NOx accumulator and, under some circumstances, are introduced additionally into the exhaust tract, are oxidized outside, downstream of the NOx accumulator, in a second catalytic converter.

In accordance with an additional mode of the invention, the heat flow to be discharged through the use of the heat exchanger is in the range of 5 kW to 50 kW.

In an internal combustion engine with an exhaust gas turbocharger, excess air is generally in any case blown off from the turbocharger. In accordance with yet another mode of the invention, this air may therefore be used in a particularly advantageous way for the forced cooling of the exhaust tract.

In accordance with yet a further mode of the invention, the heat flow is discharged in a regulated manner as a function of the load of the internal combustion engine. The regulating variable, in this case, is a temperature range of the NOx accumulator in which the latter not only adsorbs NOx reliably, but also operates undamaged, that is to say is not thermally overloaded. The regulation of the heat quantity to be discharged in the operating temperature range of the NOx accumulator of approximately 150° C. to approximately 500° C. may at the same time be regulated in a way that is known per se. This is done by the respective operating temperature being determined through the use of corresponding thermocouples, on the basis of which, for example, the quantity of coolant through the use of which the heat flow is discharged is regulated. In all cases, exceeding the maximum temperature of 800° C. due to an increase in the heat discharge, is to be avoid.

With the objects of the invention in view, there is also provided a method for regulating the temperature range of an NOx accumulator for purifying an exhaust gas stream of an internal combustion engine, which comprises operating the internal combustion engine with an air/fuel ratio of lambda$\leq$1, at least until the NOx accumulator has reached its minimum operating temperature.

According to this further aspect of the invention, which may also take effect independently of the regulation of the temperature of the NOx accumulator which takes place during subsequent operation, the internal combustion engine is operated, during cold starting, with an air/fuel ratio of lambda$\leq$1, until the NOx accumulator has reached its minimum operating temperature of approximately 150° C. Since, specifically, the internal combustion engine is operated in the rich, but at least stoichometric operating range, there are sufficient unburned hydrocarbons in the exhaust gas which serve for rapidly increasing the operating temperature of the first catalytic converter located upstream of the NOx accumulator. Due to the rapid rise in the operating temperature of the first catalytic converter, the operating temperature of the NOx accumulator of at least approximately 150° C. is, in turn, reached relatively quickly. Preferably, the NOx accumulator stores NOx and oxidizes unburned hydrocarbons.

With the objects of the invention in view, there is additionally provided an exhaust gas catalytic converter system, comprising an internal combustion engine, particularly a diesel or lean-burn engine, emitting an exhaust gas stream; an exhaust tract guiding the exhaust gas stream; an NOx accumulator disposed in the exhaust tract and having a temperature range to be regulated for purifying the exhaust gas stream; at least one first catalytic converter disposed in the exhaust tract; and at least one heat exchanger disposed upstream of the NOx accumulator in the exhaust tract.

According to this aspect of the invention, the exhaust gas catalytic converter system for carrying out the method is used particularly for diesel or lean-burn engines and in each case includes at least a first catalytic converter disposed in an exhaust tract and an NOx accumulator. According to the invention, at least one heat exchanger is disposed upstream of the NOx accumulator in the exhaust tract, with a heat flow being discharged through the use of the heat exchanger as a function of the respective operating state of the internal combustion engine.

In accordance with another feature of the invention, the NOx accumulator is disposed between a first catalytic converter and a second catalytic converter and the heat exchanger is disposed between the first catalytic converter and the NOx accumulator. It is possible, in particular, through the use of a heat exchanger disposed between the first catalytic converter and the NOx accumulator, to avoid the situation where the NOx accumulator undergoes a thermal load exceeding the limit temperature of approximately 800° C.

In accordance with a further feature of the invention, there is provided an additional heat exchanger disposed between the internal combustion engine and the first catalytic converter. The discharge of a heat flow from the exhaust system upstream of the NOx accumulator can consequently be carried out more flexibly. Two-stage heat discharge is achieved thereby, if a heat exchanger is disposed in each case both between the internal combustion engine and the catalytic converter and between the catalytic converter and the NOx accumulator. Flexibility is somewhat lower if only one heat exchanger is disposed upstream of the NOx accumulator between the internal combustion engine and the catalytic converter. However, in every case where such a configuration is adopted, the temperature of the catalytic converter can be reduced in such a way that the NOx accumulator is not thermally overloaded, that is to say its temperature is kept below 800° C. At the same time, however, under some circumstances, particularly when the internal combustion engine is under higher load, all of the unburned hydrocarbons may no longer be sufficiently oxidized, so that it may be necessary to provide a correspondingly effective further three-way catalytic converter downstream of the NOx accumulator in the direction of flow.

In accordance with an added feature of the invention, both the first catalytic converter and the second catalytic converter are constructed in each case as three-way catalytic converters. In accordance with an additional feature of the invention, it is also possible for the NOx accumulator and the second catalytic converter to be integrated in one unit. This can be implemented, for example, if the NOx accumulator has a three-way coating. In such a case, the NOx accumulator, on one hand, adsorbs NOx and, on the other hand, acts as an oxidation catalytic converter, with adsorbed NOx being reacted directly with hydrocarbons.

In accordance with an additional feature of the invention, the cooling capacity of the heat exchangers provided in the exhaust tract is in the range of 5 kW to 50 kW. In order, above all, to achieve higher cooling capacities, high-efficiency heat exchangers are required. For example, in accordance with yet another feature of the invention, the heat exchanger is constructed as a countercurrent heat exchanger. In accordance with yet a further feature of the invention, the countercurrent heat exchanger is constructed as a double-walled tube or a ribbed tube. In its interior, exhaust gas flows through it, and in the casing, which is formed by the double-wall structure, the coolant flows counter to the direction of flow of the exhaust gas. In accordance with yet an added feature of the invention, the coolant is preferably water or air which flows as a forced flow through the heat exchanger. It may be pointed out, however, that even simple ribbed tubes between the individual components or even suitably dimensioned lines cooled effectively in the airstream of a travelling vehicle may serve as heat exchangers according to the invention.

In accordance with a concomitant feature of the invention, air blown off from an exhaust gas turbocharger is used for the forced cooling of the exhaust tract.

In typical applications, the NOx accumulator can be regenerated by brief additions of hydrocarbons into the exhaust gas. This means that the stored NOx serves, due to the oxidation of unburned hydrocarbons which takes place in the NOx accumulator, as a supplier of oxygen, and nitrogen, water and $CO_2$ therefore emerge from the NOx accumulator. After the NOx has been "expelled" from the NOx accumulator in this way, the NOx accumulator recovers its original capacity for adsorbing NOx delivered in the exhaust gas from the internal combustion engine. In order to ensure that a quantity of hydrocarbons which is provided for regeneration also reaches the NOx accumulator, it is beneficial if the first catalytic converter has only a low storage capacity for oxygen, so that the hydrocarbons are not already oxidized there and consequently virtually expended.

Other features which are considered as characteristic for the invention are set forth in the appended claims.

Although the invention is illustrated and described herein as embodied in a method and a device for regulating the temperature range of an NOx accumulator in an exhaust system of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
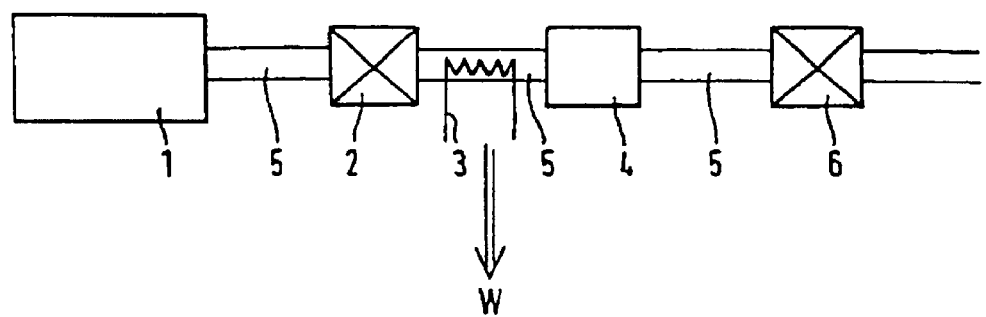
FIG. 1 is a schematic and block diagram of a first exemplary embodiment of an exhaust gas purification system according to the invention.

Referring now to the figures of the drawings in detail and first, particularly, to FIG. 1 thereof, there is seen a basic illustration of an exhaust gas purification system according to the invention. Exhaust gas passes from an internal combustion engine 1 into an exhaust tract or line 5, in which a first catalytic converter 2 and a second catalytic converter 6 are disposed. An NOx accumulator or storage device 4 is disposed between the two catalytic converters 2, 6. A heat exchanger 3 is disposed between the first catalytic converter 2 and the NOx accumulator 4 in the exhaust tract 5. When the exhaust gas passes from the internal combustion engine 1 through the exhaust tract 5 to the first catalytic converter 2, an oxidation of unburned hydrocarbons and of carbon monoxide takes place in an exothermal reaction after the first catalytic converter 2 has reached its operating temperature, which can be carried out, for example, by a non-illustrated additionally mounted heating device. As a result of the exothermal reaction taking place in the first catalytic converter 2, energy is supplied to the exhaust gas stream, with the result that the temperature of the latter rises. When the internal combustion engine is under high load, operating temperatures of approximately 1000° C. or above occur at a downstream outlet of the first catalytic converter 2. The maximum temperature of the NOx accumulator 4 disposed downstream of the first catalytic converter 2 in the exhaust line is approximately 800° C. and its functioning capacity is in the range of approximately 150° C. to approximately 500° C. Therefore, an exhaust gas stream at such a high temperature would lead to premature destruction of the NOx accumulator 4 or to malfunctioning, with the result that the environmentally harmful NOx could not be removed from the exhaust gas stream. For this reason, the heat exchanger 3 is provided between the first catalytic converter 2 and the NOx accumulator 4. A load-dependent discharge of a heat flow W can be carried out to through the use of the heat exchanger 3, particularly when the internal combustion engine is under high load. In principle, such a heat exchanger may also be located upstream of the first catalytic converter 2, insofar as this does not entail disadvantages for the cold-starting behavior.

A regulated discharge of the heat flow W is carried out depending on the heat energy released in the first catalytic converter 2 as a result of the exothermal reaction and contained in the exhaust gas stream, and therefore depending on the temperature of the exhaust gas stream leaving the first catalytic converter 2. That discharge thus ensures that the temperature of the NOx accumulator remains in the desired range. The heat energy extracted from the exhaust gas stream may be used in the vehicle for heating purposes or the like.

The first catalytic converter 2 already oxidizes a relatively high percentage of the unburned hydrocarbons contained in the exhaust gas stream and of the carbon monoxide contained therein, at correspondingly high operating temperatures. Therefore there are, as a rule, no longer sufficient quantities of unburned hydrocarbons for reaction with the NOx stored in the NOx accumulator 4. It is therefore necessary, specifically depending on the operating conditions, to additionally inject unburned hydrocarbons at intervals into the exhaust tract 5 upstream of the NOx accumulator 4. The second catalytic converter 6 is provided downstream of the NOx accumulator 4 in order to ensure that, under all operating conditions, as complete a purification of the exhaust gas as possible takes place. The second catalytic converter 6 also oxidizes the unburned hydrocarbons which are additionally introduced and consequently delivers an essentially purified exhaust gas.

Figure 2:
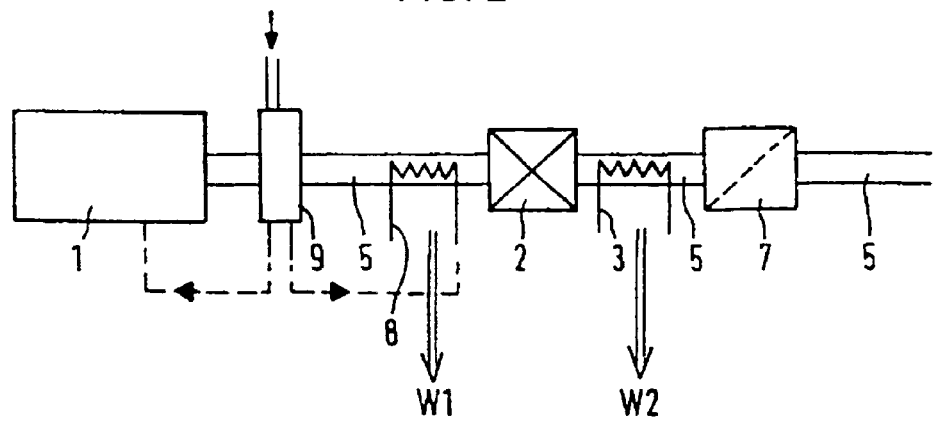
FIG. 2 is a schematic and block diagram of a second exemplary embodiment of an exhaust gas purification system according to the invention.

FIG. 2 illustrates a further exemplary embodiment of an exhaust gas catalytic converter system according to the invention. In this exhaust gas catalytic converter system, the exhaust gas stream is led from the internal combustion engine 1 into the exhaust tract or line 5, in which first and second heat exchangers 3, 8, a first catalytic converter 2 and an NOx accumulator or storage device 7 provided with a three-way catalyst coating, are disposed. The first heat exchanger 3 is once again disposed between the catalytic converter 2 and the NOx accumulator 7, corresponding to the exemplary embodiment of FIG. 1. Through the use of this heat exchanger 3, it is possible, according to the respective operating load or the respective operating state of the internal combustion engine 1, to discharge a defined heat flow W2 out of the exhaust gas stream. In addition, the second heat exchanger 8 is provided between the internal combustion engine 1 and the catalytic converter 2. An additional heat flow W1 can be discharged out of the exhaust gas stream through the use of the second heat exchanger S. The result of this, however, is that the inlet temperature of the catalytic converter 2 decreases. The consequence thereof are, where appropriate, that the exothermal reaction taking place there is also slowed. Consequently, its temperature at the outlet of the catalytic converter 2 is lower than in the case of the exemplary embodiment according to FIG. 1. Therefore, in an operating situation in which both heat exchangers 3, 8 are in operation, the heat flow $W_2$ to be discharged in the heat exchanger 3 is lower than in the exemplary embodiment according to FIG. 1. At all events, the heat exchangers 3, 8 serve for reducing the maximum temperature of the exhaust gas stream upon entry into the NOx accumulator 7, in order to ensure that the predeterminable temperature range of the latter is maintained.

Figure 3:
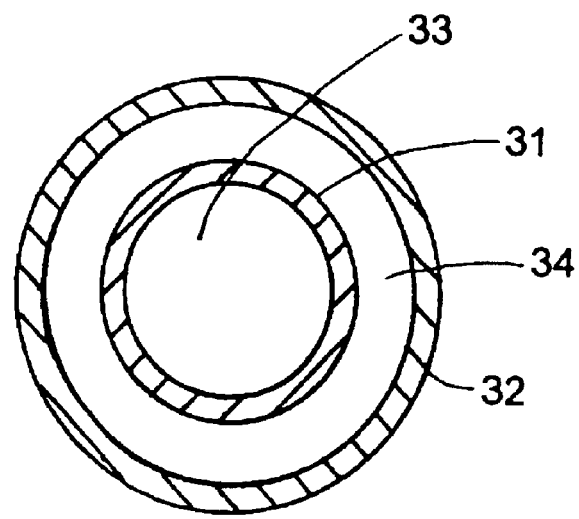
FIG. 3 is an enlarged sectional view of a further preferred exemplary embodiment of the apparatus according to the invention taken through the heat exchanger.

As is indicated in FIG. 3, a countercurrent heat exchanger is constructed as a double-walled tube having two walls 31 and 32. Exhaust gas 33 flows through its interior, and a coolant 34 flows counter to the direction of flow of the exhaust gas in the casing, which is formed by the double-wall structure. In accordance with another embodiment of the invention, the coolant is preferably water or air which flows as a forced flow through the heat exchanger.

In the case of a reduced exothermal reaction in the catalytic converter 2, unburned hydrocarbons may, under some circumstances, not react completely with NOx stored in the NOx accumulator 7 and may leave the NOx accumulator 7 in an unburned state. Therefore, the NOx accumulator 7 is provided with a three-way catalyst coating, as an integral unit. This three-way catalyst coating acts in the same way as the main catalytic converter 6 according to FIG. 1. However, the advantage is that fewer separate parts are required for the exhaust gas purification system.

If two heat exchangers 3, 8 are provided, the flexibility in adapting the heat flow to be discharged to the operating state of the internal combustion engine is markedly improved, as compared with an exemplary embodiment according to FIG. 1 having only one heat exchanger 3.

As is indicated in FIG. 2, the exhaust tract 5 may also contain an exhaust gas turbocharger 9 downstream of the internal combustion engine 1. The exhaust gas drives this turbocharger 9, so that ambient air is compressed there and is led to the internal combustion engine 1. In this case, excess air is blown off in the usual way. Therefore, according to the invention, this air may advantageously be utilized for the forced cooling of the exhaust tract 5, for example in countercurrent in the additional heat exchanger 8.

The present invention makes it possible, overall, to simply and effectively maintain a predeterminable temperature range in the NOx accumulator of an exhaust system, with the result that the quality of exhaust gas purification can be ensured under different operating conditions.

We claim:

1. In a method for regulating the temperature range of an NOx accumulator for purifying an internal combustion engine exhaust gas stream guided in an exhaust tract, the improvement which comprises:

discharging a heat flow from the exhaust gas stream upstream of the NOx accumulator as a function of an operating state of the internal combustion engine, for at least one of reliably preventing a maximum load temperature of the NOx accumulator from being exceeded and approximately maintaining a predeterminable temperature range;

discharging at least part of heat energy contained in the exhaust gas as the heat flow from the exhaust gas stream, at least one of upstream and downstream of a catalytic converter; and storing the NOx emissions intermediately in the NOx accumulator.

2. In a method for regulating the temperature range of an NOx accumulator for purifying an internal combustion engine exhaust gas stream guided in an exhaust tract, the improvement which comprises:

discharging a heat flow from the exhaust gas stream in two stages upstream of the Nox accumulator AU a function of an operating state of the internal combustion engine, for at least one of reliably preventing a maximum load temperature of the NOx accumulator from being exceeded and approximately maintaining a predeterminable temperature range; and storing the NOx emissions intermediately in the nor accumulator.

3. The method according to claim 2, which further comprises discharging the heat flow from the exhaust gas stream upstream and downstream of a catalytic converter.

4. The method according to claim 1, which further comprises storing NOx in the NOx accumulator additionally acting as an oxidation catalytic converter.

5. The method according to claim 1, which further comprises discharging the heat flow at 5 kW to 50 kw.

6. The method according to claim 1, which further comprises forced cooling the exhaust tract upstream of the NOx accumulator with blown-off air from an exhaust gas turbocharger associated with the internal combustion engine.

7. The method according to claim 1, which further comprises regulating the discharge of the heat flow, using a regulating variable being a predeterminable range of the temperature of the NOx accumulator as a function of the load of the internal combustion engine.

8. The method according to claim 1, which further comprises forming a predeterminable range of the temperature of the NOx accumulator by a lower temperature of about 150° C. and an upper temperature of 700° C.

9. The method according to claim 1, which further comprises forming a predeterminable range of the temperature of the NOx accumulator by a lower temperature of about 150° C. and an upper temperature of 500° C.

10. The method according to claim 1, which further comprises operating the internal combustion engine with an air/fuel ratio of lambda≦1, until the NOx accumulator has reached its minimum operating temperature of about 150° C.

11. An exhaust gas catalytic converter system, comprising:

an internal combustion engine emitting an exhaust gas stream;

an exhaust tract guiding the exhaust gas stream;

an NOx accumulator disposed in said exhaust tract for storing NOx emissions intermediately and having a temperature range to be regulated for purifying the exhaust gas stream;

at least one catalytic converter disposed in said exhaust tract; and at least one heat exchanger disposed upstream of said NOx accumulator in said exhaust tract.

12. The exhaust gas catalytic converter system according to claim 11, wherein said internal combustion engine is a diesel engine.

13. The exhaust gas catalytic converter system according to claim 11, wherein said internal combustion engine is a lean-burn engine.

14. The exhaust gas catalytic converter system according to claim 11, wherein said at least one catalytic converter is a first catalytic converter, a second catalytic converter is disposed in said exhaust tract, said NOx accumulator is disposed between said first and second catalytic converters, and said at least one heat exchanger is disposed upstream of said first catalytic converter.

15. The exhaust gas catalytic converter system according to claim 11, wherein said at least one catalytic converter is a first catalytic converter, a second catalytic converter is disposed in said exhaust tract, said NOx accumulator is disposed between said first and second catalytic converters, and said at least one heat exchanger is disposed between said first catalytic converter and said NOx accumulator.

16. The exhaust gas catalytic converter system according to claim 14, including an additional heat exchanger disposed between said internal combustion engine and said first catalytic converter.

17. The exhaust gas catalytic converter system according to claim 14, wherein said first catalytic converter and said second catalytic converter are each three-way catalytic converters.

18. The exhaust gas catalytic converter system according to claim 17, wherein said first catalytic converter has a very low oxygen storage capacity.

19. The exhaust gas catalytic converter system according to claim 15, wherein said first catalytic converter and said second catalytic converter are each three-way catalytic converters.

20. The exhaust gas catalytic converter system according to claim 19, wherein said first catalytic converter has a very low oxygen storage capacity.

21. The exhaust gas catalytic converter system according to claim 14, wherein said Nox accumulator and said second catalytic converter are integrated in one unit.

22. The exhaust gas catalytic converter system according to claim 11, wherein said NOx accumulator has a three-way catalytic coating.

23. The exhaust gas catalytic converter system according to claim 11, wherein said at least one heat exchanger has a cooling capacity of 5 kW to 50 kW.

24. The exhaust gas catalytic converter system according to claim 11, wherein said at least one heat exchanger is a countercurrent heat exchanger.

25. The exhaust gas catalytic converter system according to claim 24, wherein said at least one heat exchanger is a tube having two walls, an interior through which exhaust gas flows and a chamber between said two walls through which coolant flows.

26. The exhaust gas catalytic converter system according to claim 25, wherein the coolant is water or air flowing as a forced flow through said at least one heat exchanger.

27. The exhaust gas catalytic converter system according to claim 26, including an exhaust gas turbocharger associated with said internal combustion engine, said exhaust gas turbocharger producing blown-off air flowing through said at least one heat exchanger.

* * * * *